United States Patent
Endo et al.

(10) Patent No.: US 9,140,587 B2
(45) Date of Patent: Sep. 22, 2015

(54) PASSENGER'S WEIGHT MEASUREMENT DEVICE FOR VEHICLE SEAT

(71) Applicant: TS TECH CO., LTD., Shioya-gun, Tochigi (JP)

(72) Inventors: Shigeru Endo, Shioya-gun (JP); Kenji Sato, Shioya-gun (JP)

(73) Assignee: TS TECH CO., LTD., Asaka (JP)

( * ) Notice: Subject to any disclaimer, the term of this patent is extended or adjusted under 35 U.S.C. 154(b) by 132 days.

(21) Appl. No.: 13/840,865

(22) Filed: Mar. 15, 2013

(65) Prior Publication Data
US 2013/0205918 A1   Aug. 15, 2013

Related U.S. Application Data

(60) Continuation of application No. 13/601,330, filed on Aug. 31, 2012, now Pat. No. 8,822,850, which is a continuation of application No. 13/242,780, filed on Sep. 23, 2011, now Pat. No. 8,813,895, which is a (Continued)

(30) Foreign Application Priority Data

Jul. 30, 2004   (JP) ................................ 2004-223456

(51) Int. Cl.
*B60R 21/015* (2006.01)
*B60N 2/015* (2006.01)
(Continued)

(52) U.S. Cl.
CPC ................. *G01D 11/30* (2013.01); *B60N 2/002* (2013.01); *B60N 2/0732* (2013.01);
(Continued)

(58) Field of Classification Search
CPC .......... B60N 2/68; B60N 2/682; B60N 2/015; B60N 2/002; B60N 2/4263; B60N 2/0732; B60N 21/0152; B60N 21/01516; G01G 19/4142; G01G 19/08; B60R 21/015; B60R 2021/01516; Y10S 297/02
USPC ................... 177/144, 136; 180/273; 280/735; 296/63–69; 297/217.2
See application file for complete search history.

(56) References Cited

U.S. PATENT DOCUMENTS 1,679,620 A   8/1928 Moore
2,252,970 A * 8/1941 Gedris ..................... 297/452.59
(Continued)

FOREIGN PATENT DOCUMENTS

DE   103 15 400 A1   10/2004
GB   2 415 787 A   1/2006
(Continued)

OTHER PUBLICATIONS

Aug. 23, 2013 Office Action issued in U.S. Appl. No. 13/242,780.
(Continued)

*Primary Examiner* — Randy W Gibson
(74) *Attorney, Agent, or Firm* — Oliff PLC

(57) ABSTRACT

A vehicle seat includes a load sensor that is configured to measure a load applied from an occupant and a seat cushion frame that includes a right side frame and a left side frame. The load sensor is provided at a front part of one of the right and left side frames. A front end section of the one side frame more frontward than a shaft center of the rod of the load sensor includes a tapered-shape section. And an upper flange and a lower flange are formed at an upper edge and a lower edge of the tapered-shape section, respectively, the upper flange and the lower flange extending inward toward a center of the vehicle seat.

26 Claims, 9 Drawing Sheets

Related U.S. Application Data continuation of application No. 13/039,458, filed on Mar. 3, 2011, now Pat. No. 8,316,982, which is a continuation of application No. 13/010,429, filed on Jan. 20, 2011, which is a division of application No. 12/961,758, filed on Dec. 7, 2010, now Pat. No. 8,091,675, which is a division of application No. 12/536,075, filed on Aug. 5, 2009, now Pat. No. 7,870,927, which is a division of application No. 11/632,403, filed as application No. PCT/JP2005/013945 on Jul. 29, 2005, now Pat. No. 7,614,680.

(51) Int. Cl.
| | |
|---|---|
| *G01G 19/08* | (2006.01) |
| *G01D 11/30* | (2006.01) |
| *B60N 2/68* | (2006.01) |
| *B60N 2/00* | (2006.01) |
| *B60N 2/07* | (2006.01) |
| *B60N 2/42* | (2006.01) |
| *G01G 19/414* | (2006.01) |
| *G01L 5/00* | (2006.01) |

(52) U.S. Cl.
CPC .............. *B60N 2/4263* (2013.01); *B60N 2/68* (2013.01); *B60N 2/686* (2013.01); *B60R 21/015* (2013.01); *B60R 21/0152* (2014.10); *B60R 21/01516* (2014.10); *G01G 19/08* (2013.01); *G01G 19/4142* (2013.01); *G01L 5/00* (2013.01); *B60R 21/01512* (2014.10)

(56) References Cited

U.S. PATENT DOCUMENTS

| | | | |
|---|---|---|---|
| 2,589,570 A | | 3/1952 | Phillips |
| 2,589,922 A | | 3/1952 | Bowman |
| 4,178,037 A | | 12/1979 | Pickles |
| 4,182,255 A | | 1/1980 | Reid |
| 4,209,198 A | | 6/1980 | Apple, Sr. |
| 4,281,443 A | | 8/1981 | Threlfall |
| 4,353,565 A | | 10/1982 | Smith et al. |
| 4,509,796 A | | 4/1985 | Takagi |
| 4,588,225 A | | 5/1986 | Sakamoto |
| 4,597,552 A | | 7/1986 | Nishino |
| 4,630,864 A | | 12/1986 | Toll |
| 4,715,651 A | * | 12/1987 | Wakamatsu ................ 297/218.1 |
| 5,110,177 A | | 5/1992 | Akio |
| 5,222,399 A | * | 6/1993 | Kropp ........................ 73/862.68 |
| 5,240,310 A | * | 8/1993 | Rink ......................... 297/452.18 |
| 5,286,076 A | | 2/1994 | DeVoss et al. |
| 5,308,148 A | | 5/1994 | Peterson et al. |
| 5,421,124 A | | 6/1995 | Zuccaro |
| 5,478,975 A | | 12/1995 | Ford |
| 5,492,388 A | | 2/1996 | Kawasaki |
| 5,600,104 A | | 2/1997 | McCauley et al. |
| 5,714,695 A | | 2/1998 | Bruns |
| 5,775,780 A | | 7/1998 | Murphy et al. |
| 5,921,624 A | | 7/1999 | Wu |
| 5,942,695 A | | 8/1999 | Verma et al. |
| 5,991,676 A | * | 11/1999 | Podoloff et al. ................ 701/45 |
| 6,010,195 A | | 1/2000 | Masters et al. |
| 6,039,344 A | | 3/2000 | Mehney et al. |
| 6,050,635 A | | 4/2000 | Pajon et al. |
| 6,089,478 A | | 7/2000 | Truan et al. |
| 6,145,909 A | | 11/2000 | Staley et al. |
| 6,150,619 A | | 11/2000 | Borngasser |
| 6,176,543 B1 | | 1/2001 | Nawata et al. |
| 6,231,076 B1 | * | 5/2001 | Blakesley et al. ............. 280/735 |
| 6,242,701 B1 | | 6/2001 | Breed et al. |
| 6,356,200 B1 | | 3/2002 | Hamada et al. |
| 6,367,859 B1 | | 4/2002 | Flory et al. |
| 6,405,987 B1 | | 6/2002 | Andrigo et al. |
| 6,499,360 B1 | | 12/2002 | Bruns |
| 6,520,023 B2 | | 2/2003 | Kimura |
| 6,555,756 B2 | | 4/2003 | Nakamura et al. |
| 6,555,765 B2 | | 4/2003 | Paine |
| 6,559,392 B1 | | 5/2003 | Haynes et al. |
| 6,595,570 B2 | | 7/2003 | Susko |
| 6,616,239 B2 | | 9/2003 | Guillot |
| 6,637,824 B1 | | 10/2003 | Yokota |
| 6,644,903 B1 | | 11/2003 | Arand |
| 6,661,341 B2 | | 12/2003 | Masuda et al. |
| 6,677,539 B2 | | 1/2004 | Miura et al. |
| 6,684,718 B2 | | 2/2004 | Muraishi |
| 6,695,379 B1 | | 2/2004 | Ishida |
| 6,702,376 B1 | | 3/2004 | Shen |
| 6,772,985 B2 | | 8/2004 | Lee |
| 6,773,069 B1 | | 8/2004 | Kaneko et al. |
| 6,774,625 B2 | | 8/2004 | Suzuki et al. |
| 6,786,691 B2 | | 9/2004 | Alden, III |
| 6,810,984 B2 | | 11/2004 | Sakai et al. |
| 6,814,370 B2 | | 11/2004 | Yasui |
| 6,849,808 B2 | | 2/2005 | Enomoto et al. |
| 6,916,997 B2 | | 7/2005 | Thakur et al. |
| 6,929,324 B2 | | 8/2005 | Enomoto et al. |
| 6,969,809 B2 | | 11/2005 | Rainey |
| 6,981,717 B2 | | 1/2006 | Sakamoto et al. |
| 6,994,397 B2 | | 2/2006 | Young et al. |
| 7,036,864 B2 | | 5/2006 | Rehfuss et al. |
| 7,038,146 B2 | | 5/2006 | Saito et al. |
| 7,091,426 B2 | | 8/2006 | Nagai et al. |
| 7,131,513 B2 | | 11/2006 | Mutou et al. |
| 7,137,665 B2 | | 11/2006 | Osawa et al. |
| 7,137,669 B2 | | 11/2006 | Nagayama |
| 7,185,867 B2 | | 3/2007 | Hill et al. |
| 7,189,931 B2 | | 3/2007 | Hida et al. |
| 7,195,261 B2 | | 3/2007 | Yoshida et al. |
| 7,210,358 B2 | * | 5/2007 | Yamazaki ........................ 73/761 |
| 7,281,766 B2 | | 10/2007 | Fujita et al. |
| 7,322,605 B2 | | 1/2008 | Ventura et al. |
| 7,328,627 B2 | | 2/2008 | Kawabata et al. |
| 7,373,846 B2 | | 5/2008 | Furukawa et al. |
| 7,422,291 B2 | | 9/2008 | Nagayama |
| 7,435,918 B2 | | 10/2008 | Becker et al. |
| 7,438,350 B1 | | 10/2008 | Peterson et al. |
| 7,455,343 B2 | | 11/2008 | Endo et al. |
| 7,488,026 B1 | | 2/2009 | Jovicevic |
| 7,510,161 B2 | | 3/2009 | Fischer et al. |
| 7,520,175 B2 | | 4/2009 | Matsukawa et al. |
| 7,566,086 B2 | | 7/2009 | Gray et al. |
| 7,604,213 B2 | | 10/2009 | Choi et al. |
| 7,614,680 B2 | | 11/2009 | Endo et al. |
| 7,729,122 B2 | | 6/2010 | Wong |
| 7,731,281 B2 | | 6/2010 | Kurita et al. |
| 7,762,150 B2 | | 7/2010 | Kawabata et al. |
| 7,793,557 B2 | | 9/2010 | Endo et al. |
| 7,823,951 B2 | | 11/2010 | Endo et al. |
| 7,836,997 B2 | | 11/2010 | Takayasu et al. |
| 7,870,927 B2 | | 1/2011 | Endo et al. |
| 7,878,570 B2 | | 2/2011 | Endo et al. |
| 8,002,071 B2 | | 8/2011 | Endo et al. |
| 8,011,715 B2 | | 9/2011 | Endo et al. |
| 8,028,786 B2 | | 10/2011 | Takayasu et al. |
| 8,051,941 B2 | | 11/2011 | Takayasu et al. |
| 8,136,619 B2 | | 3/2012 | Hwang et al. |
| 8,136,620 B2 | | 3/2012 | Hwang et al. |
| RE43,989 E | | 2/2013 | Furukawa et al. |
| 8,371,655 B2 | | 2/2013 | Nonomiya |
| 8,540,047 B2 | | 9/2013 | Takayasu et al. |
| 8,548,687 B2 | | 10/2013 | Jefferies et al. |
| 2003/0168895 A1 | | 9/2003 | Sakai et al. |
| 2004/0032117 A1 | | 2/2004 | Pinto, IV et al. |
| 2004/0100388 A1 | | 5/2004 | Yoshida et al. |
| 2004/0160113 A1 | | 8/2004 | Rehfuss et al. |
| 2005/0061643 A1 | | 3/2005 | Rainey |
| 2005/0099041 A1 | | 5/2005 | Becker et al. |
| 2005/0109909 A1 | | 5/2005 | Osawa et al. |
| 2005/0284238 A1 | | 12/2005 | Wilkie et al. |
| 2005/0284668 A1 | | 12/2005 | Hida et al. |
| 2005/0284669 A1 | | 12/2005 | DiPaola et al. |
| 2006/0010984 A1 | | 1/2006 | Yamazaki |
| 2006/0048582 A1 | | 3/2006 | Furukawa et al. |

(56) References Cited

U.S. PATENT DOCUMENTS

| | | |
|---|---|---|
| 2007/0012487 A1 | 1/2007 | Becker et al. |
| 2007/0028702 A1 | 2/2007 | Sakamoto et al. |
| 2007/0045986 A1 | 3/2007 | Lirot |
| 2007/0057527 A1 | 3/2007 | Endo et al. |
| 2008/0036251 A1 | 2/2008 | Endo et al. |
| 2008/0079296 A1 | 4/2008 | Endo et al. |
| 2008/0084086 A1 | 4/2008 | Endo et al. |
| 2009/0079239 A1 | 3/2009 | Endo et al. |
| 2009/0139774 A1 | 6/2009 | Takayasu et al. |
| 2009/0139775 A1 | 6/2009 | Takayasu et al. |
| 2009/0294185 A1 | 12/2009 | Bruzzone et al. |
| 2009/0301793 A1 | 12/2009 | Endo et al. |
| 2009/0301794 A1 | 12/2009 | Endo et al. |
| 2010/0044117 A1 | 2/2010 | Takayasu |
| 2010/0282522 A1 | 11/2010 | Endo et al. |
| 2011/0000719 A1 | 1/2011 | Takayasu et al. |
| 2011/0006580 A1 | 1/2011 | Ishimoto et al. |
| 2011/0018301 A1 | 1/2011 | Endo et al. |
| 2011/0018302 A1 | 1/2011 | Endo et al. |
| 2011/0073381 A1 | 3/2011 | Endo et al. |
| 2011/0094803 A1 | 4/2011 | Takayasu et al. |
| 2011/0108330 A1 | 5/2011 | Endo et al. |
| 2011/0303469 A1 | 12/2011 | Saito et al. |

FOREIGN PATENT DOCUMENTS

| | | |
|---|---|---|
| JP | 63-026466 U | 2/1988 |
| JP | 05-043031 U | 6/1993 |
| JP | 8-164039 A | 6/1996 |
| JP | 9-207638 A | 8/1997 |
| JP | 10-297334 A | 11/1998 |
| JP | 11-108746 A | 4/1999 |
| JP | 11-304579 A | 11/1999 |
| JP | 2000-280813 A | 10/2000 |
| JP | 2001-030819 A | 2/2001 |
| JP | 2001-050329 A | 2/2001 |
| JP | 2001-158269 A | 6/2001 |
| JP | 2003-011709 A | 1/2003 |
| JP | 2003-166872 A | 6/2003 |
| JP | 2003-237535 A | 8/2003 |
| JP | 2003-287458 A | 10/2003 |
| JP | 2004-210167 A | 7/2004 |
| JP | 2004-306849 A | 11/2004 |
| JP | 2005-049272 A | 2/2005 |
| JP | 2008-296657 A | 12/2008 |
| WO | 2005/012849 A1 | 2/2005 |

OTHER PUBLICATIONS

Apr. 3, 2013 Office Action issued in U.S. Appl. No. 12/588,922.
Oct. 9, 2013 Office Action issued in U.S. Appl. No. 12/588,922.
Oct. 22, 2013 Office Action issued in U.S. Appl. No. 13/010,429.
Jun. 13, 2013 Office Action issued in U.S. Appl. No. 13/175,565.
Jan. 8, 2014 Office Action issued in U.S. Appl. No. 13/175,565.
Nov. 13, 2013 Office Action issued in U.S. Appl. No. 12/985,932.
Dec. 13, 2013 Office Action issued in U.S. Appl. No. 13/601,330.
May 14, 2014 Office Action issued in U.S. Appl. No. 13/010,429.
"Radius" from eFunda Design Standards website, Copyright 2010 by eFunda, Inc. (http://www.efunda.com/designstandards/plastic_design/radius.cfm).
"What is eFunda" from eFunda Design Standards website, Copyright 2010 by eFunda, Inc. (http://www.efunda.com/about/about.cfm).
English-language translation of Japanese Office Action in Application No. 2004-223456, mailed Aug. 3, 2010.
Office Action for U.S. Appl. No. 12/536,075, mailed Apr. 7, 2010.
Office Action for U.S. Appl. No. 12/536,075, mailed Oct. 15, 2010.
Office Action for U.S. Appl. No. 12/536,124, mailed Jul. 1, 2010.
Notice of Allowance for U.S. Appl. No. 12/536,075, mailed Nov. 8, 2010.
Office Action for U.S. Appl. No. 12/536,151, mailed Aug. 10, 2010.
Office Action for U.S. Appl. No. 11/992,418, mailed Jul. 2, 2009.
Notice of Allowance for U.S. Appl. No. 11/992,418, mailed Feb. 18, 2010.
Office Action for U.S. Appl. No. 11/992,418, mailed Jun. 3, 2010.
Office Action for U.S. Appl. No. 12/588,922, mailed Sep. 29, 2010.
European Search Report for European Application No. 10007613.2 dated Oct. 9, 2010.
U.S. Appl. No. 12/961,758, filed Dec. 7, 2010.
Office Action for U.S. Appl. No. 11/992,418, mailed Jan. 13, 2011.
Office Action for U.S. Appl. No. 12/875,594, mailed Jan. 20, 2011.
Notice of Allowance for U.S. Appl. No. 12/536,124, mailed Jan. 18, 2011.
U.S. Appl. No. 12/985,932, filed Jan. 6, 2011.
U.S. Appl. No. 13/010,429 filed Jan. 20, 2011.
Office Action for U.S. Appl. No. 12/536,151, mailed Jan. 31, 2011.
May 24, 2012 Second Office Action issued in Chinese Application No. 201010552150.5 with English-language translation.
Aug. 2, 2012 Office Action issued is U.S. Appl. No. 13/137,713.
Apr. 9, 2012 Office Action issued in U.S. Appl. No. 13/105,483.
Dec. 15, 2011 Search Report issued in European Application No. 11181454.7.
Jan. 31, 2011 Office Action issued in U.S. Appl. No. 12/536,151.
Sep. 9, 2011 Notice of Allowance issued in U.S. Appl. No. 12/961,758.
Sep. 15, 2011 Office Action issued in U.S. Appl. No. 12/985,932.
Jun. 6, 2011 Office Action issued in U.S. Appl. No. 13/039,458.
Nov. 16, 2011 Office Action issued in U.S. Appl. No. 13/010,429.
U.S. Appl. No. 13/242,780, filed Sep. 23, 2011.
Office Action issued Jun. 7, 2011 in U.S. Appl. No. 11/992,418.
Notice of Allowance issued Jul. 29, 2011 in U.S. Appl. No. 11/992,418.
Notice of Allowance issued Jul. 13, 2011 in U.S. Appl. No. 12/875,594.
Office Action for U.S. Appl. No. 12/588,922, mailed Mar. 8, 2011.
Notice of Allowance for U.S. Appl. No. 12/536,151, mailed Mar. 25, 2011.
Office Action for U.S. Appl. No. 12/961,758, mailed Mar. 28, 2011.
Office Action for U.S. Appl. No. 13/010,429, mailed May 2, 2011.
Jan. 28, 2013 Final Office Action issued in U.S. Appl. No. 13/137,713.
Feb. 11, 2013 Office Action issued in U.S. Appl. No. 13/175,565.
Sep. 22, 2014 Office Action issued in U.S. Appl. No. 13/836,773.
Sep. 22, 2014 Office Action issued in U.S. Appl. No. 13/840,930.
Sep. 25, 2014 Office Action issued in U.S. Appl. No. 13/841,156.
Sep. 25, 2014 Office Action issued in U.S. Appl. No. 13/841,207.
Jan. 23, 2015 Office Action issued in U.S. Appl. No. 13/840,930.
Feb. 3, 2015 Office Action issued in U.S. Appl. No. 13/836,773.
Feb. 3, 2015 Office Action issued in U.S. Appl. No. 13/841,207.
Jan. 26, 2015 Office Action issued in U.S. Appl. No. 13/841,156.

* cited by examiner

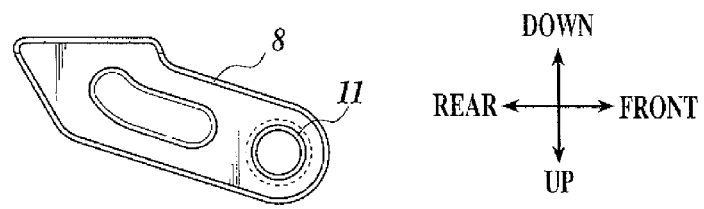
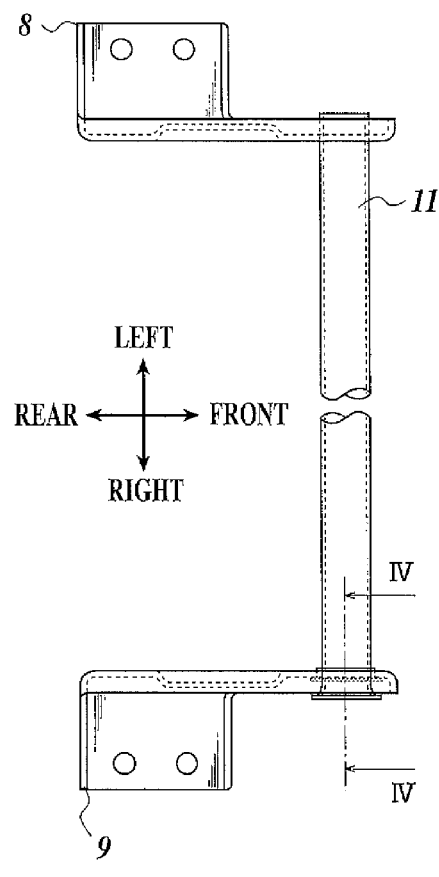
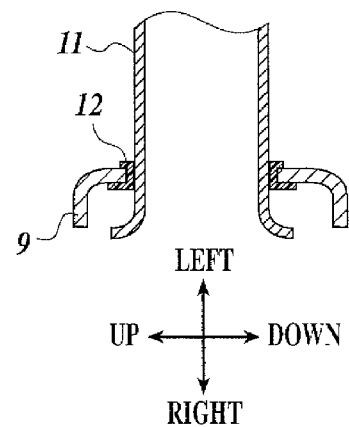

PASSENGER'S WEIGHT MEASUREMENT DEVICE FOR VEHICLE SEAT

The present application is a Continuation of U.S. application Ser. No. 13/601,330 filed Aug. 31, 2012, which is a Continuation of U.S. application ser. No. 13/242,780 filed on Sep. 23, 2009, which is a Continuation of U.S. application Ser. No. 13/039,458 filed Mar. 3, 2011, which is a Continuation of U.S. application Ser. No. 13/010,429 filed Jan. 20, 2011, which is a Divisional of U.S. application Ser. No. 12/961,758 filed Dec. 7, 2010, which is a Divisional of U.S. application Ser. No. 12/536,075 filed Aug. 5, 2009, which is a Divisional of U.S. application Ser. No. 11/632,403 filed Jan. 12, 2007, which is National Stage of International Application No. PCT/JP2005/013945 filed Jul. 29, 2005, which claims the benefit of priority from Japanese Patent Application No. 2004-223456 filed Jul. 30, 2004. The disclosure of each of the prior applications is hereby incorporated by reference in its entirety.

TECHNICAL FIELD

The present invention relates to a passenger's weight measurement device for a vehicle seat which measures a weight of a passenger who sits on a vehicle seat.

BACKGROUND ART

Recently, to improve performance of various safety devices such as a seat belt and an air bag, operations of the safety devices have been controlled in accordance with a weight of a passenger sitting on a vehicle seat in some cases. In the conventional passenger's weight measurement device for measuring a weight of a seated passenger, a load sensor is disposed between a vehicle floor and the vehicle seat (For example, refer to Patent Document 1 and Patent Document 2).

Patent Document 1:Japanese Patent Document 10-297334
Patent Document 2:Japanese Patent Document 11-304579

DISCLOSURE OF THE INVENTION

Problem to be Solved by the Invention

However, because the load sensor is disposed in a narrow space between the vehicle floor and the vehicle seat, it is difficult to do maintenance on the load sensor. Further, if the entire vehicle seat is dismounted for easier maintenance, the working efficiency of the maintenance is to be inefficient. Accordingly, a first object of the present invention is to secure the space around the load sensor. A further object is to enable maintenance of the load sensor to be easily carried out.

Means for Solving the Problem

To solve the aforementioned problems, in accordance with a first aspect of the present invention, a passenger's weight measurement device for a vehicle seat comprises a movable rail disposed to be movable in a front-and-rear direction on a fixed rail fixed to a vehicle side, a load sensor which is mounted on an upper surface of the movable rail, a cushion frame which is mounted on the load sensor, and a pan frame which is detachably disposed on the cushion frame to cover the cushion frame from above at an upper side of the load sensor.

As described above, because the pan frame is detachably mounted on the cushion frame, the maintenance of the load sensor can be done by only dismounting the pan frame. In such way, the maintenance of the load sensor can be done without decomposing/disassembling the cushion frame of the vehicle seat. Thus, the efficiency of the load sensor maintenance is improved.

In accordance with the first aspect of the invention, preferably, the pan frame is tightened to the cushion frame by a screw.

As described above, because the pan frame is tightened to the cushion frame by a screw, the pan frame can be dismounted from the cushion frame just by loosening the screw.

In accordance with the first aspect of the invention, preferably, the cushion frame has a gouged section formed on a side so as to avoid the load sensor when seen from above.

As described above, because a gouged section is formed on the cushion frame, the maintenance of the load sensor can be done from above without disassembling the cushion frame. Thus, the efficiency of the load sensor maintenance is improved.

Further, in accordance with a second aspect of the present invention, a passenger's weight measurement device for a vehicle seat comprises a movable rail disposed to be movable in a front-and-rear direction on a fixed rail fixed to a vehicle side, a load sensor which is mounted on an upper surface of the movable rail, and a cushion frame which is mounted on the load sensor, wherein the cushion frame has a gouged section formed on a side so as to avoid the load sensor when seen from above.

As described above, because a gouged section is formed on the cushion frame, the maintenance of the load sensor can be done from above without decomposing/disassembling the cushion frame. Thus, the efficiency of the load sensor maintenance is improved.

Effect of the Invention

According to the present invention, the load sensor maintenance can be done easily without decomposing/disassembling the cushion frame for the vehicle seat. Thus, the efficiency of the load sensor maintenance is improved.

BRIEF DESCRIPTION OF THE DRAWINGS

[FIG. 4A] This is a side view showing an attachment structure of a submarine pipe 11.

[FIG. 4B] This is a plan view showing an attachment structure of a submarine pipe 11.

[FIG. 4C] This is a schematic sectional diagram cut along the line IV-IV of FIG. 4B.

BEST MODE FOR CARRYING OUT THE INVENTION

Figure 1:
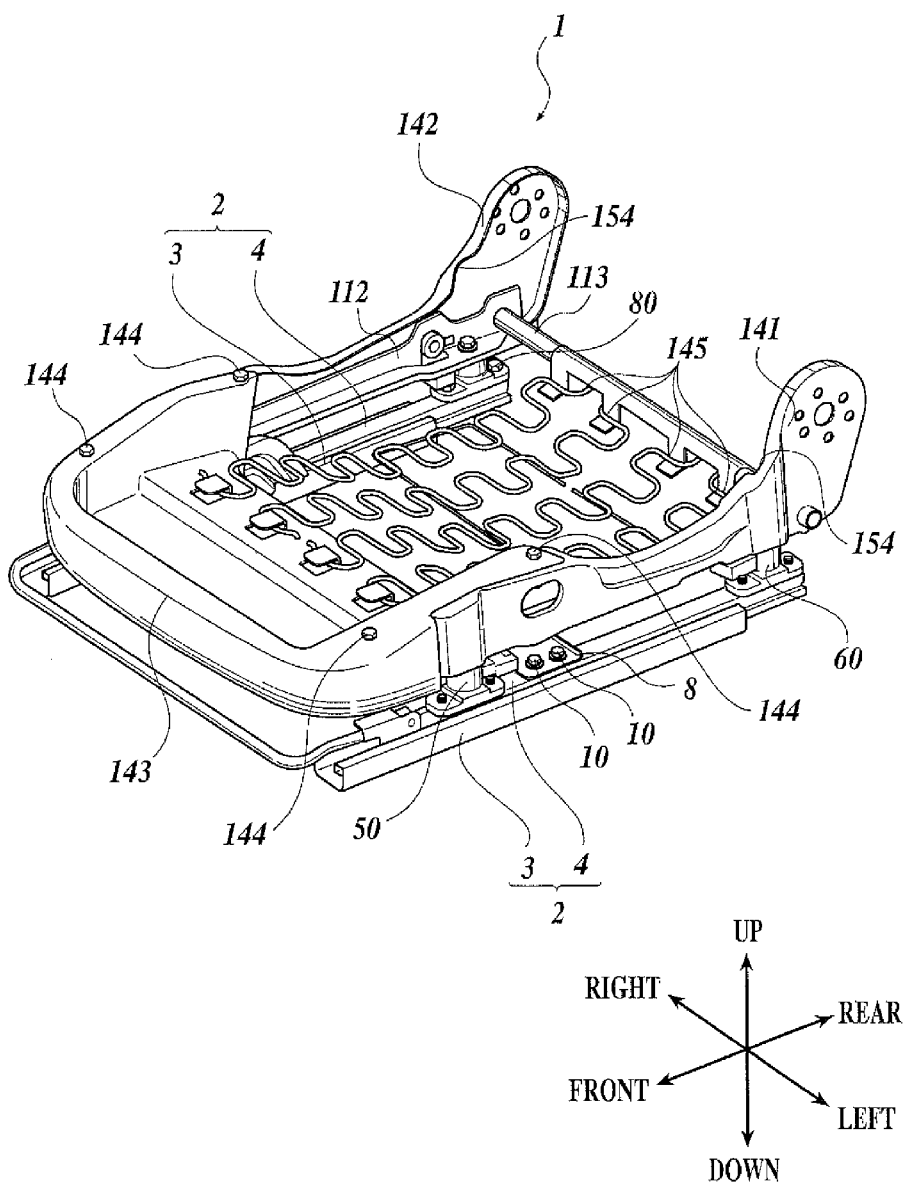
[FIG. 1] This is a perspective view showing a passenger's weight measurement device 1 for a vehicle seat.

The preferred embodiments of the present invention will be described below with reference to the accompanying drawings. In the embodiments below, various technical preferable limitations are added to carry out the invention, However, the scope of the invention is not limited to the embodiment described below and the examples shown in the drawings.

Figure 2:
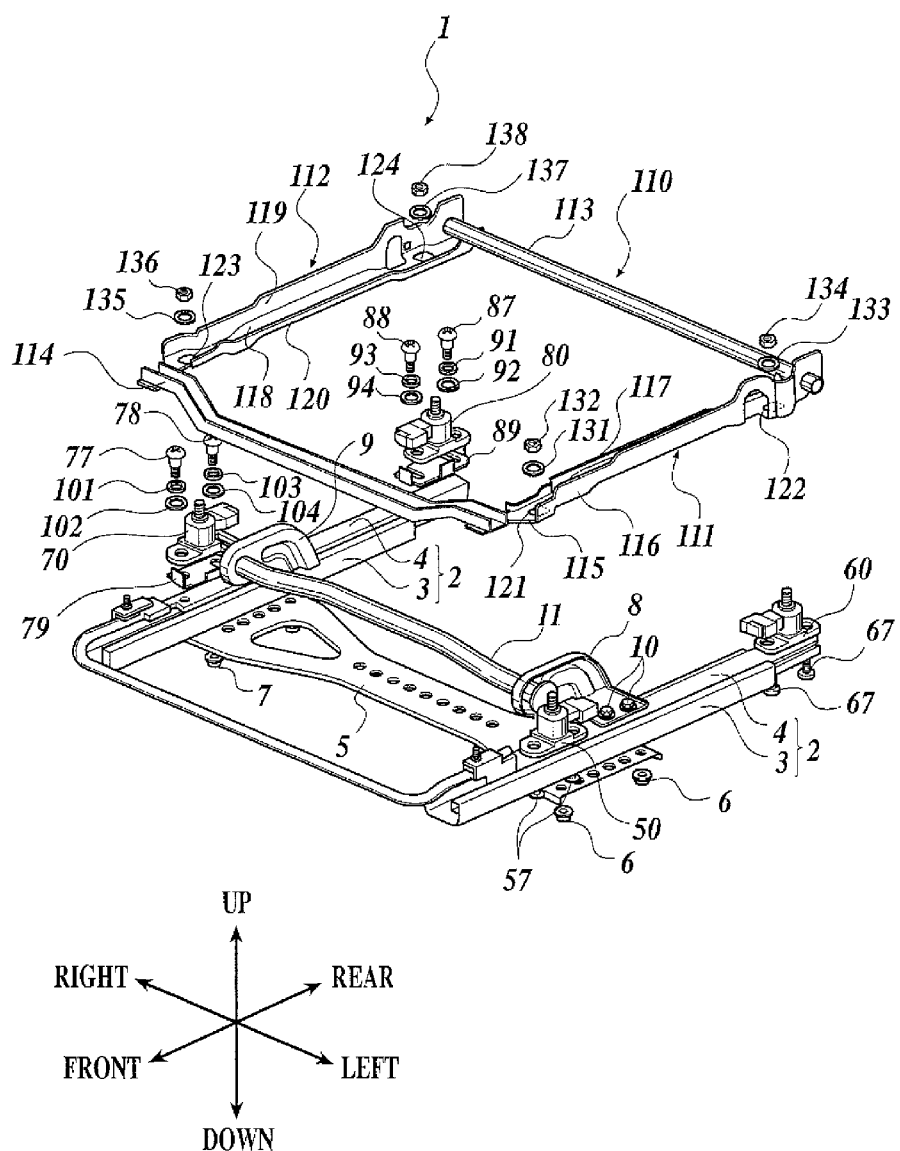
[FIG. 2] This is an exploded perspective view showing a passenger's weight measurement device 1.
Figure 3:
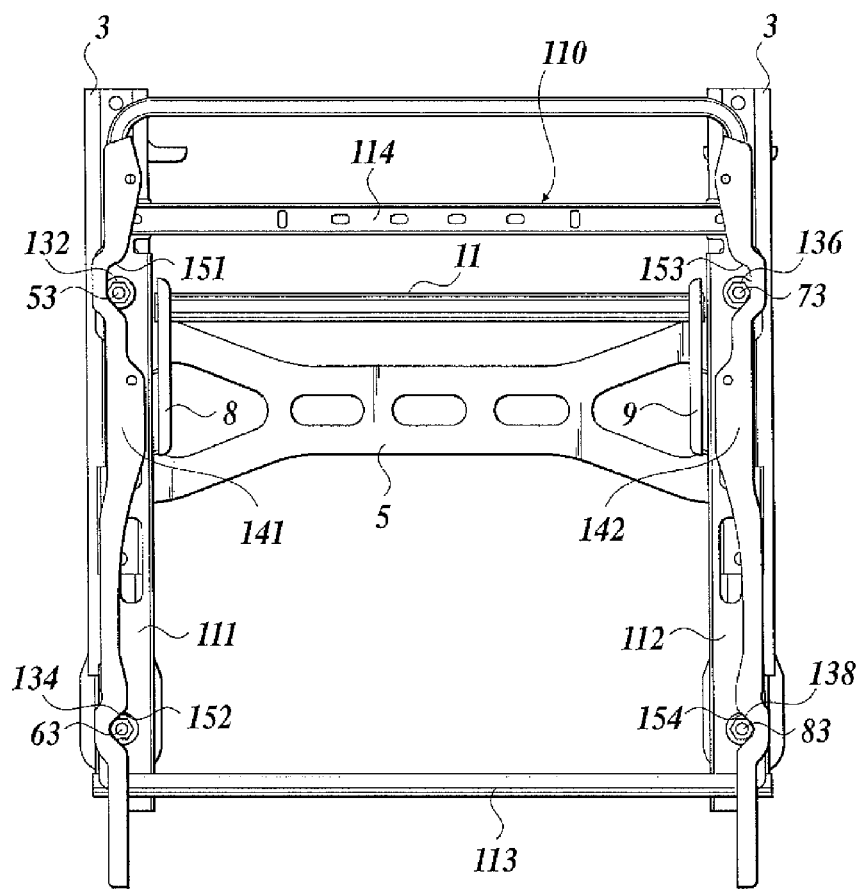
[FIG. 3] This is a plan view showing a passenger's weight measurement device 1.

FIG. 1 is a perspective view showing a passenger's weight measurement device 1 for a vehicle seat, FIG. 2 is an exploded perspective view showing a passenger's weight measurement device 1, and FIG. 3 is a plan view showing a passenger's weight measurement device 1 seen from above. In each of the drawings, arrows indicating up-and-down, left-and-right, and front-and-rear correspond to the directions as seen from a passenger seated in the vehicle seat.

The passenger's weight measurement device 1 is mounted on the bottom of a seat cushion which a passenger sits on. Further, the passenger's weight measurement device 1 is for the right side seat of the vehicle seat, and a buckle for a seatbelt is provided at the left side of the passenger's weight measurement device 1 and a tongue plate of the seatbelt is to be fastened by this buckle.

As shown in FIGS. 1, 2, and 3, a pair of left and right seat-sliders 2 parallel to each other are disposed on the floor of the passenger compartment. Both of the seat-sliders 2 comprise a fixed lower rail 3 which extends in a front-and-rear direction of the vehicle and is fixed to the floor of the passenger compartment, and a movable upper rail 4 which is engaged with the fixed lower rail 3 to be slidable in a front-and-rear direction on the fixed lower rail 3 with respect to the fixed lower rail 3.

A left end of the lower bracket 5 is fixed to the lower surface of the left fixed lower rail 3 by a bolt and nut connection 6, and a right end of the lower bracket 5 is fixed to the lower surface of the right fixed lower rail 3 by a bolt and nut connection 7. The lower bracket 5 is crossed between the left and right fixed lower rails 3 and improves the rigidity to suppress the variable of a space between the left and right fixed lower rails 3.

The bracket 8 is fixed to the middle portion of the left movable upper rail 4 in a front-and-rear direction on an upper surface thereof by a bolt and nut connection 10, and the bracket 9 is fixed to the middle portion of the right movable upper rail 4 in a front-and-rear direction on an upper surface thereof by a bolt and nut connection. Both brackets 8 and 9 are formed in an L-shape when seen from the front and they are disposed so as to erect them with respect to the upper surface of each of the movable upper rails 4 respectively.

In between the brackets 8 and 9, a submarine pipe 11 is provided. Here, the brackets 8 and 9 and the submarine pipe 11 will be described in detail with reference to FIGS. 4A to 4C. FIG. 4A is a left side view, FIG. 4B is a top view, and FIG. 4C is a schematic sectional diagram cut along the line IV-IV of FIG. 4B.

A mounting hole which penetrates in a left-and-right direction is formed on the left bracket 8 and the left end of the submarine pipe 11 is inserted into the mounting hole. Further, the bracket 8 and the submarine pipe 11 are fixed by welding.

A mounting hole which penetrates in a left-and-right direction is also formed on the right bracket 9 and the ring-shaped nylon bush 12 is fitted in the mounting hole. The bush 12 is latched by the bracket 9 along the edge of the mounting hole, and the moving of the bush 12 in the penetration direction of the mounting hole is deterred. The right end of the submarine pipe 11 is inserted into the bush 12, and the submarine pipe 11 can slide in the penetration direction of the mounting hole with respect to the bush 12. Moreover, the sectional area of the submarine pipe 11 at a. predetermined distance apart towards the right end of the submarine pipe 11 from the mounting hole of the bracket 9 (here, the area at the right end) is formed to be larger than the area of the mounting hole. Particularly, the submarine pipe 11 is provided in a shape where the opening of the submarine pipe 11 becomes larger as it approaches the right end in the right side of the mounting hole of the bracket 9 (trumpet shape) to prevent the submarine pipe 11 from falling out from the bush 12 and the mounting hole. By providing a frange at the right end of the submarine pipe 11, the sectional area of the submarine pipe 11 including the frange can be made larger than the mounting hole and the submarine pipe 11 may be prevented from falling out from the bush 12 and the mounting hole by the frange.

In the present embodiment, the submarine pipe 11 is fixed to the left bracket 8 and can slide in a left-and-right direction with respect to the right bracket 9. However, the submarine pipe 11 may slide in a left-and-right direction with respect to the left bracket 8 and may be fixed to the right bracket 9. Further, the submarine pipe 11 may slide in a left-and-right direction with respect to both left and right brackets 8 and 9.

As shown in FIGS. 1 and 2, a load sensor 50 is mounted on the front end of the upper surface of the left movable upper rail 4, and a load sensor 60 is mounted on the rear end of the upper surface of the left movable upper rail 4 . The load sensors 50 and 60 detect the load as an electrical signal.

Figure 5:
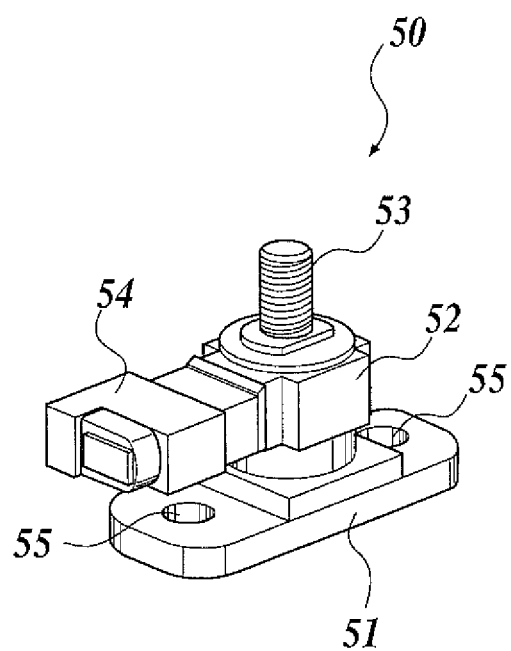
[FIG. 5] This is a perspective view showing a left load sensor 50.

The left front load sensor 50 will be described with reference to FIG. 5. FIG. 5 is a perspective view showing the left front load sensor 50. As shown in FIG. 5, the left front load sensor 50 comprises a column-shaped sensing unit 52 which detects the load, a plate-like frange 51 which horizontally extends in a front direction and in a rear direction from the bottom end of the sensing unit 52, a load input rod 53 which extends upward from an upper end of the sensing unit 52, and a connector 54 which extends from the sensing unit 52 to become horizontal with the frange 51. At the front and the rear of the frange 51, male screw shaped circular holes 55 which penetrate in an up-and-down direction are formed respectively, and one of the circular holes 55 is located directly beneath the connector 54. A screw thread is formed on the periphery of the load input rod 53. Moreover, the sensing unit 52 incorporates a strain gauge, and the load is converted to an electrical signal by the strain gauge.

Figure 6:
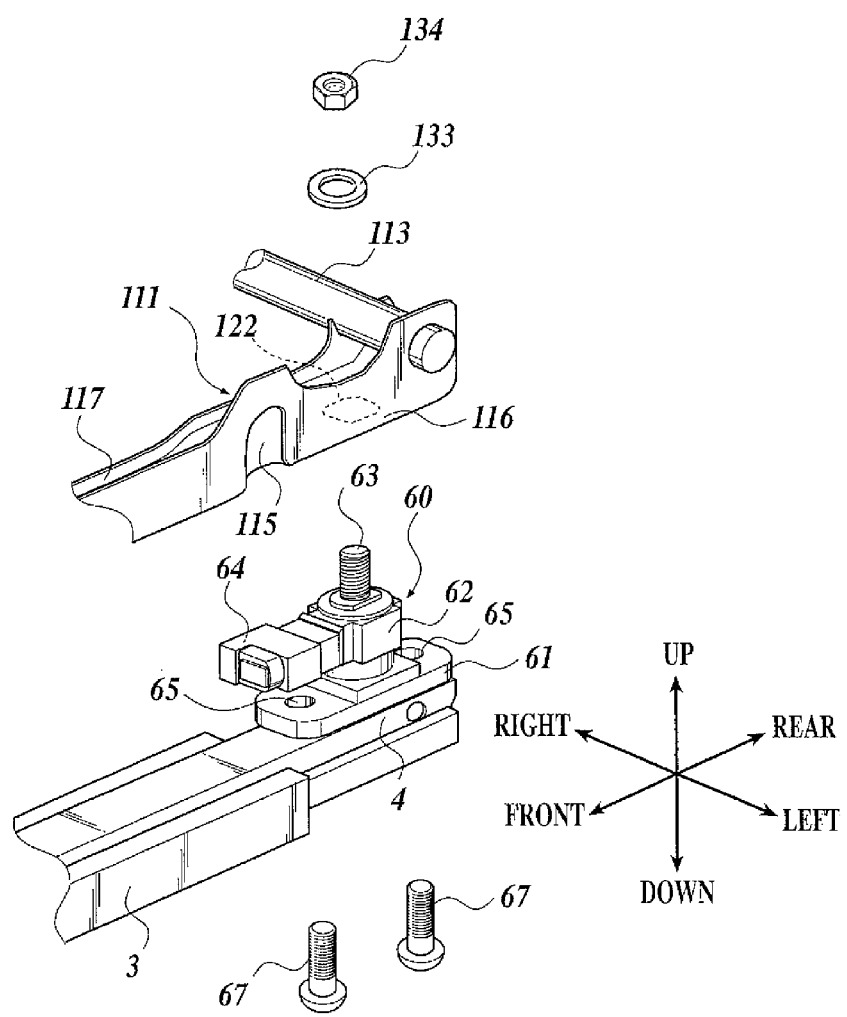
[FIG. 6] This is an exploded perspective view showing an attachment structure of a load sensor 60.

FIG. 6 is an exploded perspective view showing a rear end of the left movable upper rail 4. As shown in FIG. 6, similar to the left front load sensor 50, the left rear load sensor 60 comprises a frange 61, a sensing unit 62, a load input rod 63, and a connector 64. References having the same last single digit are assigned to the corresponding parts of the left front load sensor 50 and the left rear load sensor 60, and the description for each part of the left rear load sensor 60 is omitted.

The left rear load sensor 60, as shown in FIG. 6, is disposed on the rear end of the left movable upper rail 4. The lower surface of the frange 61 abuts the upper surface of the left movable upper rail 4, and the male screws 67 and 67 which penetrate the movable upper rail 4 from bottom up engage with the circular holes 65 and 65. By the tightening of the male screws 67 and 67, the movable upper rail 4 is held between the heads of the male screws 67 and 67 and the frange 61. In such way, the load sensor 60 is fixed to the upper surface of the movable upper rail 4. On the other hand, as shown in FIGS. 1 and 2, similar to the case of the load sensor 60, the left front load sensor 50 is fixed to the front upper surface of the movable upper rail 4 by engaging the male screws 57 and 57 which penetrate the movable upper rail 4 from bottom up with the circular holes 55 and 55. Here, the tip of the connector 54 is directed backward for the left front load sensor 50, while the tip of the connector 64 is directed forward for the left rear load sensor 60.

As shown in FIG. 2, a load sensor 70 is mounted on the front end of the upper surface of the right movable upper rail 4, and a load sensor 80 is mounted on the rear end of the upper surface of the right movable upper rail 4. The load sensors 70 and 80 are provided to detect the load as an electrical signal.

Figure 7:
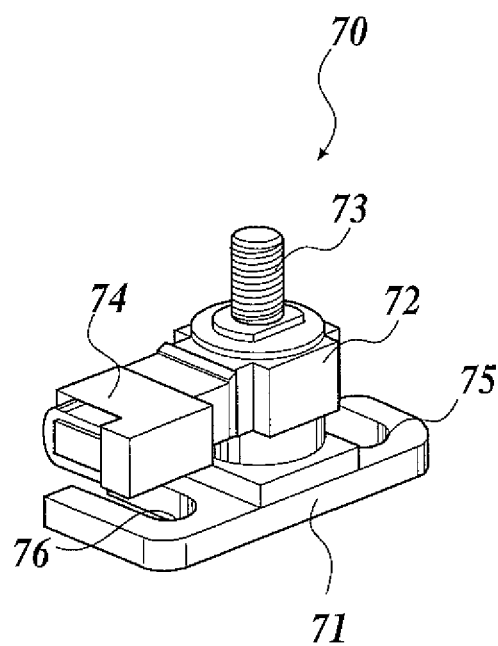
[FIG. 7] This is a perspective view showing a right load sensor 70.

The right front load sensor 70 will be described with reference to FIG. 7. FIG. 7 is the perspective view showing the right front load sensor 70. As shown in FIG. 7, the right front load sensor 70 comprises a column-shaped sensing unit 72 which detects the load, a plate-like frange 71 which horizontally extends in the front direction and in the rear direction from the bottom end of the sensing unit 72, a load input rod 73 which extends upward from the upper end of the sensing unit 72, and a connector 74 which extends from the sensing unit 72 to become horizontal with the frange 71. An elongated hole 75 which penetrates the frange 71 in an up-and-down direction and has a left-and-right direction as the longitudinal direction is formed on either front part or back part of the frange 71, and a notch 76 which has an opening at the edge along the longitudinal direction of the frange 71 and has a left-and-right direction as the longitudinal direction is formed on the other part. The notch 76 is formed on the frange 71 directly beneath the connector 74. A screw thread is formed on the periphery of the load input rod 73. Moreover, the sensing unit 72 incorporates a strain gauge, and the load is converted to an electrical signal by the strain gauge.

Figure 8:
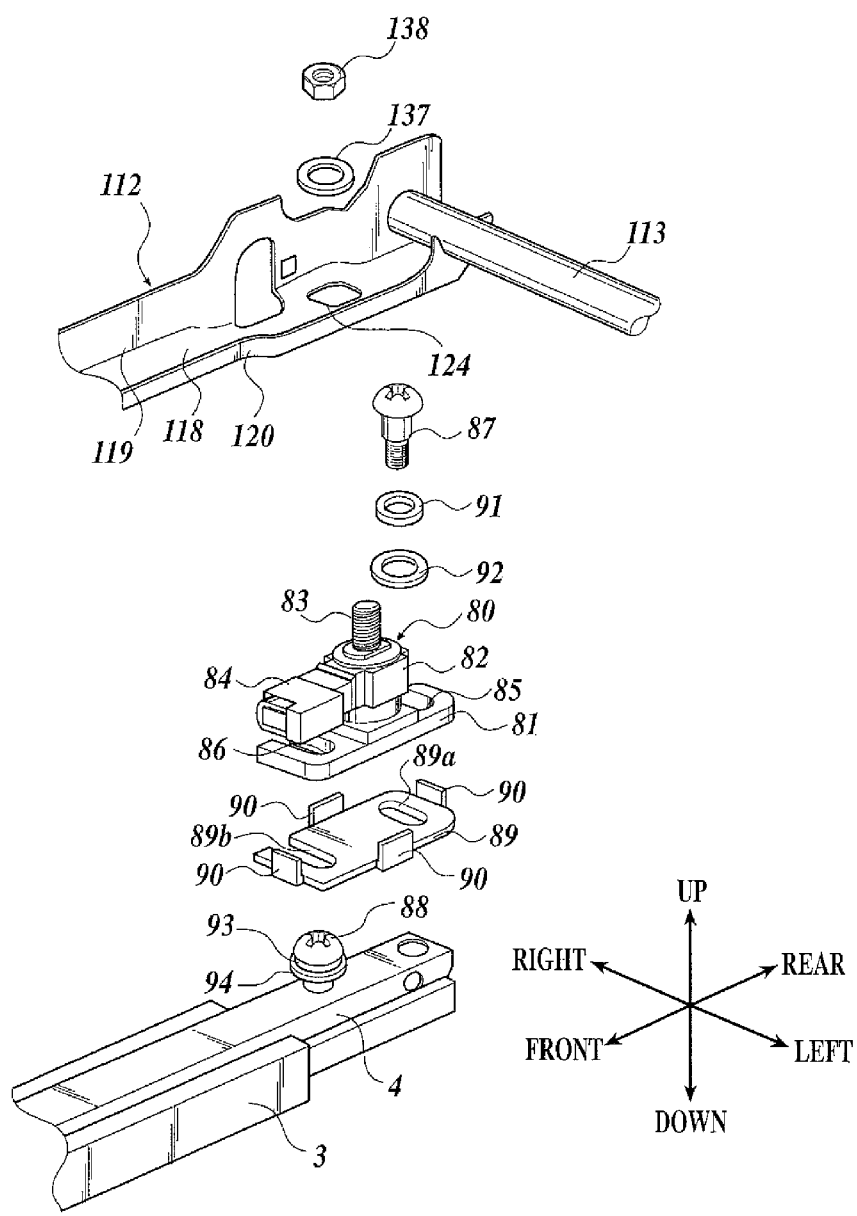
[FIG. 8] This is an exploded perspective view showing an attachment structure of a load sensor 80.

FIG. 8 is an exploded perspective view showing a rear end of the movable upper rail 4. As shown in FIG. 8, similarly to the right front load sensor 70, the right rear load sensor 80 comprises a frange 81, a sensing unit 82, a load input rod 83, and a connector 84. References having the same last single digit are assigned to the corresponding parts of the right front load sensor 70 and the right rear load sensor 80, and the description of each part of the right rear load sensor 80 is omitted.

The right rear load sensor 80 is disposed on the rear end of the right movable upper rail 4 as shown in FIG. 8. A slide plate 89 having approximately the same shape as the planar shape of the frange 81 abuts the lower surface of the frange 81, and the frange 81 is grasped by four pawls 90 formed at the edge of the slide plate 89. On the slide plate 89, an elongated hole 89a which penetrates the slide plate 89 in an up-and-down direction and has a left-and-right direction as the longitudinal direction is formed. Further, a notch 89b which has an opening at the edge along the longitudinal direction of the slide plate 89 and has a left-and-right direction as the longitudinal direction is formed on the slide plate 89. The elongated hole 89a corresponds to the elongated hole 85 of the load sensor 80, and the notch 89b corresponds to the notch 86 of the load sensor 80.

The frange 81 is disposed on the upper surface of the movable upper rail 4 in a state where the slide plate 89 abuts the upper surface of the right movable upper rail 4. Further, the level screw 87 which is inserted into the ring-shaped damper 91 and the slide member 92 is inserted into the elongated hole 85 from above as a slider, and the level screw 87 is disposed so as to erect it with respect to the upper surface of the movable upper rail 4 by engaging the level screw 87 with the movable upper rail 4. The slide plate 89, the frange 81, the slide member 92, and the damper 91 are held between the head of the level screw 87 and the movable upper rail 4, and the level screw 87 can slide in the longitudinal direction of the elongated hole 85.

Further, the level screw 88 which is inserted into the ring-shaped damper 93 and the slide member 94 is engaged with the movable upper rail 4 so as to erect it on the upper surface of the movable upper rail 4, and the level screw 88 is inserted into the notch 86 as the slider. The slide plate 89, the frange 81, the slide member 94, and the damper 93 are held between the head of the level screw 88 and the movable upper rail 4, and the level screw 88 can slide in the longitudinal direction of the notch 86. In such way, the level screw 87 slides in the longitudinal direction of the elongated hole 85, and the level screw 88 slides in the longitudinal direction of the notch 86. Therefore, the right rear load sensor 80 can slide in a left-and-right direction with respect to the right movable upper rail 4 in the range between the point where the level screw 87 abuts the right end of the elongated hole 85 and the point where the level screw 87 abuts the left end of the elongated hole 85.

The mounting instruction for the right rear load sensor 80 is as described below. First, the level screw 88 is inserted into the damper 93 and the slide member 94, in this order, and the level screw 88 is engaged with the movable upper rail 4 so as to erect it on the upper surface of the movable upper rail 4. However, the head of the level screw 88 is to be apart from the upper surface of the movable upper rail 4. Next, the slide plate 89 is fitted to the frange 81 of the right rear load sensor 80, and the frange 81 is grasped by the pawls 90 of the slide plate 89. Then, the frange 81 is to abut the upper surface of the movable upper rail 4 via the slide plate 89, and the level screw 88 is inserted into the damper 91 and the slide member 92, in this order. Further, the level screw 87 is inserted into the elongated hole 85 and the level screw 87 is engaged with the movable upper rail 4. At this state, the level screw 88 is not in the notch 86. Next, by rotating the right rear load sensor 80 centering the level screw 87, the level screw 88 is inserted into the opening of the notch 86 at the edge of the frange 81 and the level screw 88 is latched by the notch 86. In such way, because the notch 86 is located directly beneath the connector 84, the connector 84 becomes an obstacle and the level screw 88 cannot be inserted into the notch 86 from above to be engaged with the movable upper rail 4. However, because the level screw 88 is engaged with the movable upper rail 4 beforehand and the notch 86 has an opening at the edge of the frange 81, the level screw 88 can be inserted into the notch 86 by the rotation of the load sensor 80. Moreover, because the frange 81 is held between the head of the level screw 88 and the movable upper rail 4, the load sensor 80 does not depart upward easily. In addition, because the frange 81 of the load sensor 80 is grasped by the pawls 90, the slide plate 89 does not slide with respect to the frange 81 when the load sensor 80 rotates.

The lower surface of the slide plate 89 is coated by a resin or the like so that the slide plate 89 is easily slid with respect to the movable upper rail 4. Instead of providing the coated slide plate 89, the frange 81 can be made to be easily slid with respect to the movable upper rail 4 by coating the lower surface of the frange 81 with a resin or the like.

As shown in FIG. 2, the right front load sensor 70 is mounted on the upper surface of the movable upper rail 4 in a similar way as the load sensor 80, and the mounting instruction for the right front load sensor 70 is the same as the case of the right rear load sensor 80. That is, the slide plate 79 disposed in a same way as the slide plate 89 is grasped by the pawls to the lower surface of the frange 71, and the level screw 77 which is inserted into the damper 101 and the slide member 102 comes through the elongated hole 75 from above to be engaged with the movable upper rail 4 so as to erect it on the upper surface of the movable upper rail 4, the level screw 78 which is inserted into the damper 103 and the slide member 104 is engaged with the movable upper rail 4 so as to erect it on the upper surface of the movable upper rail 4, and the level screw 78 is inserted into the notch 76 by the rotation of the right front load sensor 70. Because the level screw 77 can slide in the longitudinal direction of the elongated hole 75 and the level screw 78 can slide in the longitudinal direction of the notch 76, the load sensor 70 can slide in a left-and-right direction with respect to the right movable upper rail 4 in the range between the point where the level screw 77 abuts the right end of the elongated hole 75 and the point where the level screw 77 abuts the left end of the elongated hole 75. Here, the tip of the connector 74 is directed backward for the right front load sensor 70, while the tip of the connector 84 is directed forward for the right rear load sensor 80.

As shown in FIGS. 2 and 3, the sub frame 110 in a shape of a rectangle frame which becomes a part of the seat cushion frame is mounted and fixed on the four load sensors 50, 60, 70, and 80. The sub frame 110 comprises a left patch member 111 which extends in a front-and-rear direction, a right patch member 112 which extends in a front-and-rear direction to become parallel with the patch member 111, a cross pipe 113 which is crosses between the rear ends of the patch members 111 and 112, and a front member 114 which crossed between the front ends of the patch members 111 and 112.

The patch member 111 is a metal material having a web 115 and left and right franges 116 and 117, and is U-shaped in section. The length of the web 115 in a front-and-rear direction is longer than the length of the franges 116 and 117 in a front-and-rear direction, the front end of the web 115 projects more in front than the front ends of the franges 116 and 117, and the webs 115 and 116 are not provided on the left and right of the front end of the web 115. The right patch member 112 is also a metal material having the web 118 and the left and right franges 119 and 120, and is U-shaped in section, and the webs 119 and 120 are not provided at the left and right of the front end of the web 118. The mounting hole 121 is formed at the front end of the web 115 of the left patch member 111 and the mounting hole 122 is formed at the rear end of the web 115 to penetrate in an up-and-down direction. The mounting hole 123 is formed at the front end of the web 118 of the right patch member 112 to penetrate in an up-and-down direction, and the mounting hole 124 is formed at the rear end of the web 118 to penetrate in an up-and-down direction.

The front member 114 is a metal material having the web and front and back franges, and is U-shaped in section. The left end of the front member 114 is welded to the upper surface of the projected front end of the web 115, and the right end of the front member 114 is welded to the upper surface of the projected front end of the web 116. A harness which is connected to the connectors 54, 64, 74, and 84 of the load sensors 50, 60, 70, and 80 is applied to the front member 114 by clips.

The mounting hole is formed to penetrate in a left-and-right direction at the rear end of the frange 116 of the left patch member 111, the cross pipe 113 is inserted into this mounting hole, and further, the cross pipe 113 and the frange 116 are fixed by welding. The mounting hole which penetrates in a left-and-right direction is also formed at the rear end of the frange 119 of the right patch member 112, the cross pipe 113 is inserted in this mounting hole, and the cross pipe 113 and the frange 119 are fixed by welding.

The sub frame 110 which is assembled as described above is disposed to the load sensor 50, 60, 70, and 80 as described below. The load input rod 53 of the left front load sensor 50 is inserted into the mounting hole 121 of the left patch member 111 from bottom up and the front end of the left patch member 111 is mounted on the sensing unit 52. Then, the washer 131 is provided around the load input rod 53 as a ring, the nut 132 engages with the load input rod 53, the washer 131 and the web 115 are held between the nut 132 and the upper surface of the sensing unit 52, and the load input rod 53 is fixed to the front end of the left patch member 111 by the tightening of the nut 132. Similarly, the load input rod 73 is inserted into the mounting hole 123 and the washer 135 from bottom and the rear end of the right patch member 112 is mounted on the sensing unit 72. The load input rod 73 is fixed to the front end of the right patch member 112 by the tightening of the nut 136 which is engaged with the load input rod 73.

Similarly for the rear load sensors 60 and 80, by the tightening of the nuts 134 and 138 which are engaged with the load input rods 63 and 83 that are inserted into the mounting holes 122 and 124 and the washer 133 and 137 from bottom, the load input rods 63 and 83 are fixed to the rear end of the patch members 111 and 112.

Here, because the right load sensors 70 and 80 are disposed to be slidable in a left-and-right direction with respect to the right movable upper rail 4, each of the mounting holes 121 to 124 can be fitted to the load input rods 53, 63, 73, and 83, respectively, with minor adjustments of the load sensors 70 and 80 in a left-and-right direction. Therefore, when the sub frame 110 is disposed, the initial deformation of the sub frame 110 and the like can be prevented, and the initial load to the load sensor 50, 60, 70, and 80 can be eliminated.

The sub frame 110 is assembled by welding in advance before disposing to the load sensor 50, 60, 70, and 80. However, when the sub frame 110 is assembled, the patch member 111, the patch member 112, the cross pipe 113, and the front member 114 are fixed by the jig so that each of the mounting holes 121 to 124 can fit to the load input rods 53, 63, 73, and 83, respectively. Therefore, the load input rods 53, 63, 73, and 83 can be matched and inserted into each of the mounting holes 121 to 124, respectively, without deforming the assembled sub frame 110.

As shown in FIG. 3, in a state where the sub frame 110 is disposed on the load sensors 50, 60, 70, and 80, when seen from above as a plan view, the front member 114 is positioned more in front than the submarine pipe 11.

Figure 9:
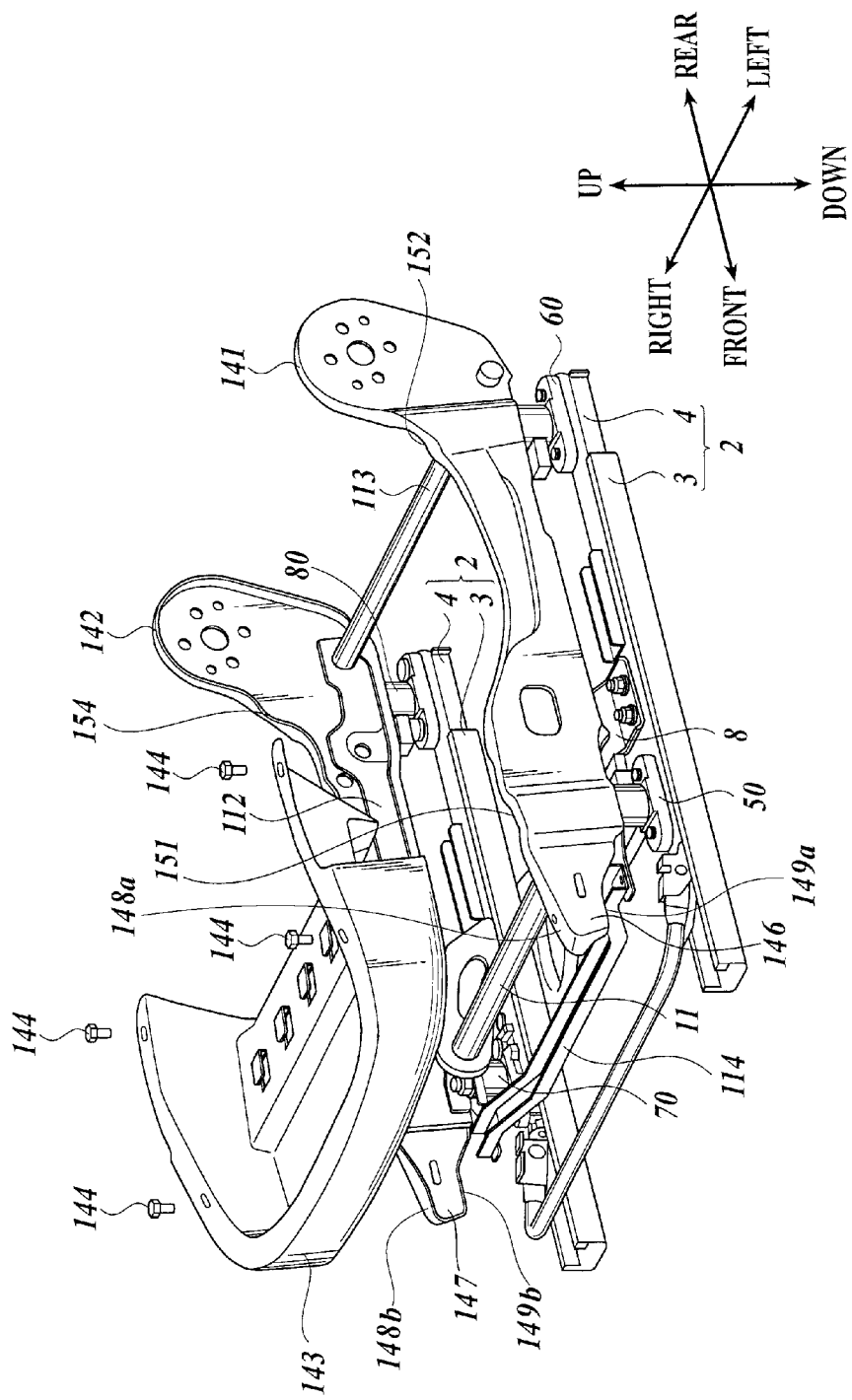
[FIG. 9] This is a perspective view showing a passenger's weight measurement device 1 in a state where a pan frame 143 is dismounted.

As shown in FIGS. 1 and 3, the side frame 141 is welded to the flange 116 outside of the patch member 111, and the side frame 142 is welded to the flange 119 outside of the patch member 112. The side frames 141 and 142 are parts of the seat cushion frame, and particularly, constitute the side portion of the seat cushion frame. As best shown in FIG. 9, the forward parts 146 and 147 of the side frames 141 and 142 may constitute tapered-shape sections, these forward parts 146 and 147 being bounded, respectively, by upper flanges 148a, 148b and lower flanges 149a, 149b. Further, the sub frame 110 reinforces the side frames 142 and 142 as a part of the frame of the seat cushion. Before disposing the sub frame 110 on the load sensors 50, 60, 70, and 80, the side frames 141 and 142 are disposed to the sub frame 110 by welding. In FIG. 2, to make the drawing easier to be seen, the side frames 141 and 142 are omitted from the drawing.

A gouged section 151 dieted to the left is formed at the front of the left side frame 141 so as to avoid the load rod 53 of the load sensor 50 and the mounting hole 121, and a gouged section 152 dinted to the left is formed at the rear of the side frame 141 so as to avoid the load rod 63 of the load sensor 60 and the mounting hole 122. Because these gouged sections are formed, maintenance of the load sensors 50 and 60 can be done from above and the nuts 53 and 63 can be rotated without being disturbed by the side frame 141. As described above, maintenance and the like of the load sensor 50 and 60 can be done without dismounting the side frame 141 from the sub frame 110. Therefore, the efficiency of the maintenance of the load sensors 50 and 60 is improved.

Further, a gouged section 153 dinted to the right is formed at the front of the right side frame 142 so as to avoid the load rod 73 of the load sensor 70 and the mounting hole 123, and a gouged section 154 dinted to the right is formed at the rear of the side frame 141 so as to avoid the load rod 83 of the load sensor 80 and the mounting hole 124. Because these gouged sections 153 and 154 are formed, maintenance of the load sensors 70 and 80 can be done from above and the nuts 73 and 73 can be rotated without being disturbed by the side frame 142.

As shown in FIG. 1, the front parts of the side frames 141 and 142 are covered by the pan frame 143 from above, and the gouged sections 151 and 153 are blocked by the pan frame 143 at the upper side of the load sensors 50 and 70. The pan frame 143 is tightened with respect to the side frames 141 and 142 by the bolt 144 as a male screw. Moreover, as shown in FIG. 9, the pan frame 143 can be dismounted by loosening the bolt 144. The pan frame 143 may be tightened to the side frame 141 and 142 by other male screw instead of the bolt 144. In FIG. 2, to make the drawing easier to be seen, the pan frame 143 is omitted from the drawing.

Because the pan frame 143 is detachably disposed on the side frames 141 and 142, the maintenance of the load sensors 50 and 70 can be done just by dismounting the pan frame 143 and without decomposing/disassembling the side frames 141 and 142 and the sub frame 110. Therefore, the efficiency of the maintenance of the load sensor 50 and 70 is improved.

The pan frame 143 is disposed on the side frames 141 and 142 by locking the locking unit formed on the pan frame 143 with the locking unit formed on the side frames 141 and 142, and the pan frame 143 can be detached from the side frames 141 and 142 by elastically deforming both of the locking units.

The seat spring 145 is crossed between the cross pipe 113 and the pan frame 143. A cushion is mounted on the pan frame 143 and the seat spring 145, and the cushion, the pan frame 143, and the side frames 141 and 142 are covered with a cover entirely.

The backrest frame is connected to the rear end of the side frames 141 and 142. The backrest frame is disposed to be rotatable in a front-and-rear direction centering the connecting unit which connects the backrest frame to the side frames 141 and 142. The backrest frame is omitted from the drawing to make the drawing easier to be seen.

In the passenger's weight measurement device 1 configured as described above, when a passenger sits on the seat cushion, the weight (body weight) of the passenger is applied to the load sensors 50, 60, 70, and 80 through the sub frame 110, and the weight of the passenger is detected by the load sensors 50, 60, 70, and 80 as an electrical signal.

Here, each one of the load sensors 50, 60, 70, and 80 is disposed between the movable upper rail 4 and the side frames 141 and 142, so as to attach one sensor in the front and one sensor in the rear. The load sensors 50, 60, 70, and 80 are configured to move in a front-and-rear direction as a unit with the vehicle seat. Therefore, despite of the position of the vehicle seat in a front-and-rear direction, the load (weight of a passenger) transmitted to the load sensors 50, 60, 70, and 80 from the vehicle seat can be consistently kept constant. Thus, the accuracy of the passenger's weight measurement can be improved.

Further, the right load sensors 70 and 80 can slide in a left-and-right direction with respect to the movable upper rail 4. Therefore, even when the load is applied in a left-and-right direction with respect to the sub frame 110 and the like, the load escapes due to the sliding of the load sensors 70 and 80 and the load in a left-and-right direction is not applied to the load sensors 50, 60, 70, and 80. Thus, the accuracy of the passenger's weight measurement can be improved.

While the right load sensors 70 and 80 can slide with respect to the right movable upper rail 4, the left load sensors 50 and 60 are fixed to the left movable upper rail 4. Therefore, the entire vehicle seat does not sway in a left-and-right direction and the minimum rigidity as a vehicle seat is assured.

Moreover, because the submarine pipe 11 is located more in rear than the front member 114, when a frontward inertia force is applied to the passenger due to a front collision or the like of the vehicle, the buttocks of the passenger seated on the vehicle seat are held by the submarine pipe 11. Therefore, so-called submarine phenomenon where the passenger gets under the waist belt can be prevented.

Further, because the submarine pipe 11 is provided separately from the front member 114, the buttocks of the passenger do not hit against the front member 114 at the time of front collision or the like of the vehicle. Therefore, the forward inertia force at the time of front collision or the like of the vehicle is not transmitted to the load sensors 50, 60, 70, and 80 through the sub frame 110. Thus, the accuracy of the passenger's weight measurement can be improved even at the time of front collision or the like of the vehicle.

Moreover, because the buttocks of the passenger are held by the submarine pipe 11 at the time of front collision or the like of the vehicle, there is a case where the submarine pipe bends forward in convex. Here, because the right end of the submarine pipe 11 can move in a left-and-right direction with respect to the bracket 9 and is not fixed to the bracket 9, the load is not transmitted to the load sensors 50, 60, 70, and 80 even when the forward load is applied to the submarine pipe 11. Thus, the accuracy of the passenger's weight measurement can be improved even at the time of front collision or the like of the vehicle.

Further, because the sub frame 110 is assembled beforehand, each of the load input rods 53, 63, 73, and 83 can be matched and inserted into the mounting holes 121 to 124, respectively, without deforming the assembled sub frame 110. Therefore, application of the initial load to the load sensors 50, 60, 70, and 80 can be prevented when the load is not applied to the sub frame 110. Thus, the accuracy of the passenger's weight measurement can be improved.

Further, only the webs 115 and 118 are provided at the front end of the patch members 111 and 112, and the franges 116, 117, 119, and 120 are not provided there. Therefore, because the patch members 111 and 112 are deformed at the front end of the webs 115 and 118 thereof when a large load is applied to the sub frames 110 at the time of front collision or the like of the vehicle, the load is alleviated at the deformed portion. Therefore, a large load is not transmitted to the load sensors 50, 60, 70, and 80, even when a large load is applied to the sub frame 110. Thus, the accuracy of the passenger's weight measurement can be improved and the damage to the load sensors 50, 60, 70, and 80 can be suppressed even at the time of front collision or the like of the vehicle.

In addition, because the top of the front load sensors 50 and 70 are opened when the pan frame 143 is dismounted, the maintenance of the load sensors 50 and 70 can be done.

Further, the present invention is not limited to the embodiment described above. Various improvements and design changes can be made without departing from the gist of the invention.

MODIFICATION EXAMPLE 1

In the above described embodiment, the right load sensors 70 and 80 are disposed to be slidable in a left-and-right direction with respect to the movable upper rail 4. However, the right load sensor 70 and 80 may further be disposed to be slidable in a left-and-right direction with respect to the patch member 112. Moreover, the load sensors 70 and 80 may be fixed to the movable upper rail 4 and may be disposed to be slidable in a left-and-right direction with respect to the patch member 112. Here, in order to dispose the load sensors 70 and 80 to be slidable in a left-and-right direction with respect to the patch member 112, the mounting holes 123 and 124 are formed as elongated holes lengthened in a left-and-right direction, the load input rods 73 and 83 are inserted into the ring-shaped slide member, and the slide member is held between the washers 135 and 137 and the web 118. In addition, in order to fix the load sensors 70 and 80 to the movable upper rail 4, the load sensors 70 and 80 are fixed to the movable upper rail 4 in a similar way as the left load sensors 50 and 60.

MODIFICATION EXAMPLE 2

In the above described embodiment, the passenger's weight measurement device 1 is mounted on the right vehicle seat. However, the passenger's weight measurement device 1 may be mounted on the left vehicle seat. The passenger's weight measurement device for the left vehicle seat is structured in symmetrical with respect to the passenger's weight measurement device 1 described in the above embodiment. That is, in the passenger's weight measurement device for the left vehicle seat, the load sensors 70 and 80 which can slide in a left-and-right direction are on the left side and the fixed load sensors 50 and 60 are on the right side.

MODIFICATION EXAMPLE 3

In the above described embodiment, the franges 71 and 81 of the load sensors 70 and 80 horizontally extend in a front-and-rear direction. However, the franges 71 and 81 of the load sensor 70 and 80 may horizontally extend in a left-and-right direction. The longitudinal direction of the elongated holes 75 and 85 and the notches 76 and 86 formed on the franges 71 and 81 is the left-and-right direction even when the franges 71 and 81 extend in a left-and-right direction. The width of the movable upper rail 4 in a left-and-right direction can be narrower when the franges 71 and 81 extend in a front-and-rear direction, as described in the above embodiment, as compared with the case where the franges 71 and 81 extend in a left-and-right direction.

INDUSTRIAL APPLICABILITY

The passenger's weight measurement device can be applied widely to, for example, car, train, and other vehicle seats.

The invention claimed is:

1. A vehicle seat, comprising:
 a load sensor configured to measure a load applied from an occupant, the load sensor having a main body and a rod extending from the main body in a direction substantially parallel to an up-down axis of the vehicle seat; and
 a seat cushion frame comprising a right side frame and a left side frame, wherein
 the load sensor is provided at a front part of one of the right and left side frames,
 a front end section of the one side frame more frontward than a shaft center of the rod of the load sensor includes a tapered-shape section, and
 an upper flange and a lower flange are formed at an upper edge and a lower edge of the tapered-shape section, respectively, the upper flange and the lower flange extending inward toward a center of the vehicle seat.

2. The vehicle seat as claimed in claim 1, wherein
 the load sensor is attached to the one side frame via a load sensor attachment bracket, and
 the load sensor attachment bracket is attached to the one side frame at a position more rearward than a front edge of the tapered-shape section.

3. The vehicle seat as claimed in claim 1, wherein a front edge of the tapered-shape section is arranged more frontward than a front edge of the main body of the load sensor.

4. The vehicle seat as claimed in claim 1, wherein
 the load sensor is attached to the one side frame via a load sensor attachment bracket, and
 a front edge of the tapered-shape section is arranged more frontward than a front edge of the load sensor attachment bracket.

5. A vehicle seat, comprising:
 a load sensor configured to measure a load applied from an occupant, the load sensor having a main body and a rod extending from the main body in a direction substantially parallel to an up-down axis of the vehicle seat; and
 a seat cushion frame comprising a right side frame and a left side frame, wherein
 the load sensor is provided at a front part of one of the right and left side frames,
 a front end section of the one side frame more frontward than a shaft center of the rod of the load sensor includes a tapered-shape section,
 a lower flange is formed at a lower edge of the tapered-shape section, and
 the lower flange includes an inclination that is sloped upward as approaching a front edge of the tapered-shape section.

6. The vehicle seat as claimed in claim 5, wherein at least a part of the main body of the load sensor is arranged below the inclination.

7. A vehicle seat, comprising:
 a load sensor configured to measure a load applied from an occupant, the load sensor having a main body and a rod extending from the main body; and
 a seat cushion frame comprising a right side frame and a left side frame, wherein
 the load sensor is provided at one of the right and left side frames via a load sensor attachment bracket that is attached to the one side frame, the load sensor attachment bracket overlapping the load sensor in a direction parallel to an up-down axis of the vehicle seat,
 an up-down width of the one side frame behind a shaft center of the rod of the load sensor is greater than an up-down width of a front edge of the one side frame,
 a front end section of the one side frame more frontward than the shaft center of the rod of the load sensor includes a tapered-shape section, and
 an upper flange and a lower flange are formed at an upper edge and a lower edge of the tapered-shape section, respectively, the upper flange and the lower flange extending inward toward a center of the vehicle seat.

8. The vehicle seat as claimed in claim 7, wherein the load sensor attachment bracket is attached to the one side frame at a position more rearward than a front edge of the tapered-shape section, the load sensor being attached to the one side frame via the load sensor attachment bracket.

9. The vehicle seat as claimed in claim 7, wherein a front edge of the tapered-shape section is arranged more frontward than a front edge of the main body of the load sensor.

10. The vehicle seat as claimed in claim 7, wherein
a front edge of the tapered-shape section is arranged more frontward than a front edge of the load sensor attachment bracket via which the load sensor is attached to the one side frame.

11. A vehicle seat, comprising:
a load sensor configured to measure a load applied from an occupant, the load sensor having a main body and a rod extending from the main body; and
a seat cushion frame comprising a right side frame and a left side frame, wherein
the load sensor is provided at one of the right and left side frames via a load sensor attachment bracket that is attached to the one side frame, the load sensor attachment bracket overlapping the load sensor in a direction parallel to an up-down axis of the vehicle seat,
an up-down width of the one side frame behind a shaft center of the rod of the load sensor is greater than an up-down width of a front edge of the one side frame,
a front end section of the one side frame more frontward than the shaft center of the rod of the load sensor includes a tapered-shape section,
a lower flange is formed at a lower edge of the tapered-shape section, and
the lower flange includes an inclination that is sloped upward as approaching a front edge of the tapered-shape section.

12. The vehicle seat as claimed in claim 11, wherein at least a part of the main body of the load sensor is arranged below the inclination.

13. The vehicle seat as claimed in claim 7, further comprising a connecting flange that connects the upper flange and the lower flange at the front edge of the one side frame.

14. A vehicle seat, comprising:
a load sensor configured to measure a load applied from an occupant, the load sensor having a main body and a rod extending from the main body; and
a seat cushion frame comprising a right side frame and a left side frame, wherein
the load sensor is provided at one of the right and left side frames via a load sensor attachment bracket that is attached to the one side frame, the load sensor attachment bracket overlapping the load sensor in a direction parallel to an up-down axis of the vehicle seat,
an up-down width of the one side frame behind a shaft center of the rod of the load sensor is greater than an up-down width of a front edge of the one side frame,
a front end section of the one side frame more frontward than the shaft center of the rod of the load sensor includes a tapered-shape section,
a lower flange is formed at a lower end section of the tapered-shape section, and
the lower flange includes an inclination that is sloped upward as approaching a front edge of the tapered-shape section.

15. The vehicle seat as claimed in claim 14, wherein
the load sensor attachment bracket is attached to the one side frame at a position more rearward than the front end of the tapered-shape section, the load sensor being attached to the one side frame via the load sensor attachment bracket, and
the front edge of the tapered-shape section is arranged more frontward than a front edge of the main body of the load sensor.

16. The vehicle seat as claimed in claim 14, wherein
an upper flange is formed at an upper edge of the tapered-shape section,
the upper flange and the lower flange extend inward toward a center of the vehicle seat, and
at least a part of the main body of the load sensor is arranged below the inclination.

17. The vehicle seat as claimed in claim 14, wherein
a front edge of the tapered-shape section is arranged more frontward than a front edge of the main body of the load sensor, and
the front edge of the tapered-shape section is arranged more frontward than a front edge of the load sensor attachment bracket via which the load sensor is attached to the one side frame.

18. A method of using a vehicle seat, the method comprising:
fixing the vehicle seat as claimed in claim 1 to a vehicle.

19. A method of using a vehicle seat, the method comprising:
fixing the vehicle seat as claimed in claim 7 to a vehicle.

20. A method of using a vehicle seat, the method comprising:
fixing the vehicle seat as claimed in claim 14 to a vehicle.

21. A method of assembling a vehicle seat that comprises a seat cushion frame comprising a right side frame and a left side frame, the method comprising:
attaching a load sensor attachment bracket to one of the right and left side frames;
attaching, to the one side frame via the load sensor attachment bracket, a load sensor that (a) is configured to measure a load applied from an occupant of the vehicle seat, (b) has a main body, and (c) has a rod extending from the main body so that an up-down dimension of the one side frame behind a shaft center of the rod of the load sensor is greater than an up-down dimension of a front edge of the one side frame,
wherein the load sensor is attached so that the load sensor attachment bracket overlaps the load sensor in a direction parallel to an up-down axis of the vehicle seat.

22. The method as claimed in claim 21, wherein the load sensor is attached to a front part of the one side frame so that a front end section of the one side frame includes a tapered-shape section that is more frontward than a shaft center of the rod of the load sensor.

23. A method of assembling a vehicle seat that comprises a seat cushion frame comprising a right side frame and a left side frame, the method comprising:
attaching a load sensor attachment bracket to one of the right and left side frames;
attaching, to the one side frame via the load sensor attachment bracket, a load sensor that (a) is configured to measure a load applied from an occupant, (b) has a main body, and (c) has a rod extending from the main body so that (1) an up-down dimension of the one side frame behind a shaft center of the rod of the load sensor is greater than an up-down dimension of a front edge of the one side frame and (2) a front end section of the one side frame includes a tapered-shape section that is more frontward than the shaft center of the rod of the load sensor,
wherein the load sensor is attached so that the load sensor attachment bracket overlaps the load sensor in a direction parallel to an up-down axis of the vehicle seat, and wherein a lower end section of the tapered-shape section has a lower flange that includes an inclination that is sloped upward as approaching a front edge of the tapered-shape section.

24. The vehicle seat as claimed in claim 1, wherein an up-down width of the tapered-shape section continuously changes from a point more frontward than the shaft center of the rod to a front terminal end of the one side frame.

25. The vehicle seat as claimed in claim 7, wherein an up-down width of the one side frame continuously changes from a point more frontward than the shaft center of the rod to the front edge of the one side frame.

26. The vehicle seat as claimed in claim 1, wherein top and bottom contours of the tapered-shape section both taper inward toward a longitudinal midline of the one side frame.

* * * * *